United States Patent [19]

Montgomery et al.

[11] Patent Number: 5,630,498

[45] Date of Patent: May 20, 1997

[54] FOOD POSITIONING APPARATUS

[75] Inventors: Carry Montgomery, Jackson; Larry Newman, Hamden; Scott R. Jones, Jackson, all of Ohio

[73] Assignee: Luigino's, Inc., Duluth, Minn.

[21] Appl. No.: 438,565

[22] Filed: May 10, 1995

[51] Int. Cl.⁶ ................................................. B65G 47/26
[52] U.S. Cl. ........................................................ 198/434
[58] Field of Search ..................................... 198/431, 434, 198/597, 598; 426/392, 420, 518

[56] References Cited

U.S. PATENT DOCUMENTS

| | | | |
|---|---|---|---|
| 3,688,334 | 9/1972 | Peterson | 15/250.21 |
| 3,866,741 | 2/1975 | Carbon et al. | 198/434 X |
| 4,709,588 | 12/1987 | Cordes et al. | 74/103 |
| 4,732,048 | 3/1988 | Sakakibara et al. | 74/98 |
| 4,749,330 | 6/1988 | Hine | 414/744 |
| 5,101,957 | 4/1992 | Schiek | 198/431 X |
| 5,515,008 | 9/1992 | Ishida et al. | 414/744.5 |

*Primary Examiner*—James R. Bidwell
*Attorney, Agent, or Firm*—Kinney & Lange, P.A.

[57] ABSTRACT

An apparatus for positioning food components in a container that is moving along a conveyor. The apparatus has a paddle member and a link. The paddle member is movable between a first position within the container and a second position outside of the container. The paddle is also pivotable when moved between the first position and the second position. The paddle member is adapted to engage the food components and move the food components to a selected location in the container as the container moves along the conveyor. The link moves the paddle member between the first position and the second position and pivots the paddle member as the paddle member is moved between the first position and the second position.

28 Claims, 5 Drawing Sheets

FOOD POSITIONING APPARATUS

BACKGROUND OF THE INVENTION

The present invention relates generally to an apparatus for positioning food in a container. More particularly, the present invention relates to a noodle dragger having the ability to move in a multi-directional motion for positioning noodles in a desired area of the container.

Prepared foods that allow consumers to decrease the time and effort needed to prepare meals are popular with consumers. The prepared foods commonly include multiple components, such as meat, vegetable, pasta, rice, and sauce, that are packaged in a single container. It has been found that separately packaging the components during storage and heating enables the quality of prepared foods to be improved. With some prepared foods, the components are packaged in separate bags or in separate sections of a divided serving container. It is also common to place the food components in different areas of an undivided container. A benefit of the undivided serving container is that the undivided container enables the consumer to easily mix the food components after the prepared food is heated.

In commercial operations, prepared foods are typically packaged using an assembly line process. Containers are placed on a conveyor, then food components are sequentially deposited in the containers. Because of the rate at which containers move along the assembly line, it is typically more efficient to move the food component to a desired area of a container after the food component is deposited in the container rather than directly depositing the food component in the desired area of the container.

A prior art device for positioning food components includes a support arm and a paddle. With the prior art food positioning device, the paddle is fixedly attached to the support so that the paddle cannot pivot with respect to the support arm.

As the containers move along the assembly line, the prior art food positioning device pivots into a lowered position such that the paddle is in the containers. The food positioning device remains in the lowered position as the container is moved a desired distance along the assembly line. The food positioning device thereby causes the food component to be moved to the desired area of the container. Once the food components are moved to the desired area of the container, additional food components may be added to the container.

SUMMARY OF THE INVENTION

The present invention includes an apparatus for positioning food components in a container that is moving along a conveyor. The apparatus includes a paddle member and a link mechanism.

The paddle member is movable between a first position within the container and a second position outside of the container. While moving between the first position and the second position, the paddle member also pivots. The paddle member is adapted to engage the food components and move the food components to a selected location in the container as the container moves along the conveyor.

The link moves the paddle member between the first position and the second position. The link also pivots the paddle member as the paddle member is moved between the first position and the second position.

DETAILED DESCRIPTION OF THE PREFERRED EMBODIMENTS

Figure 1:
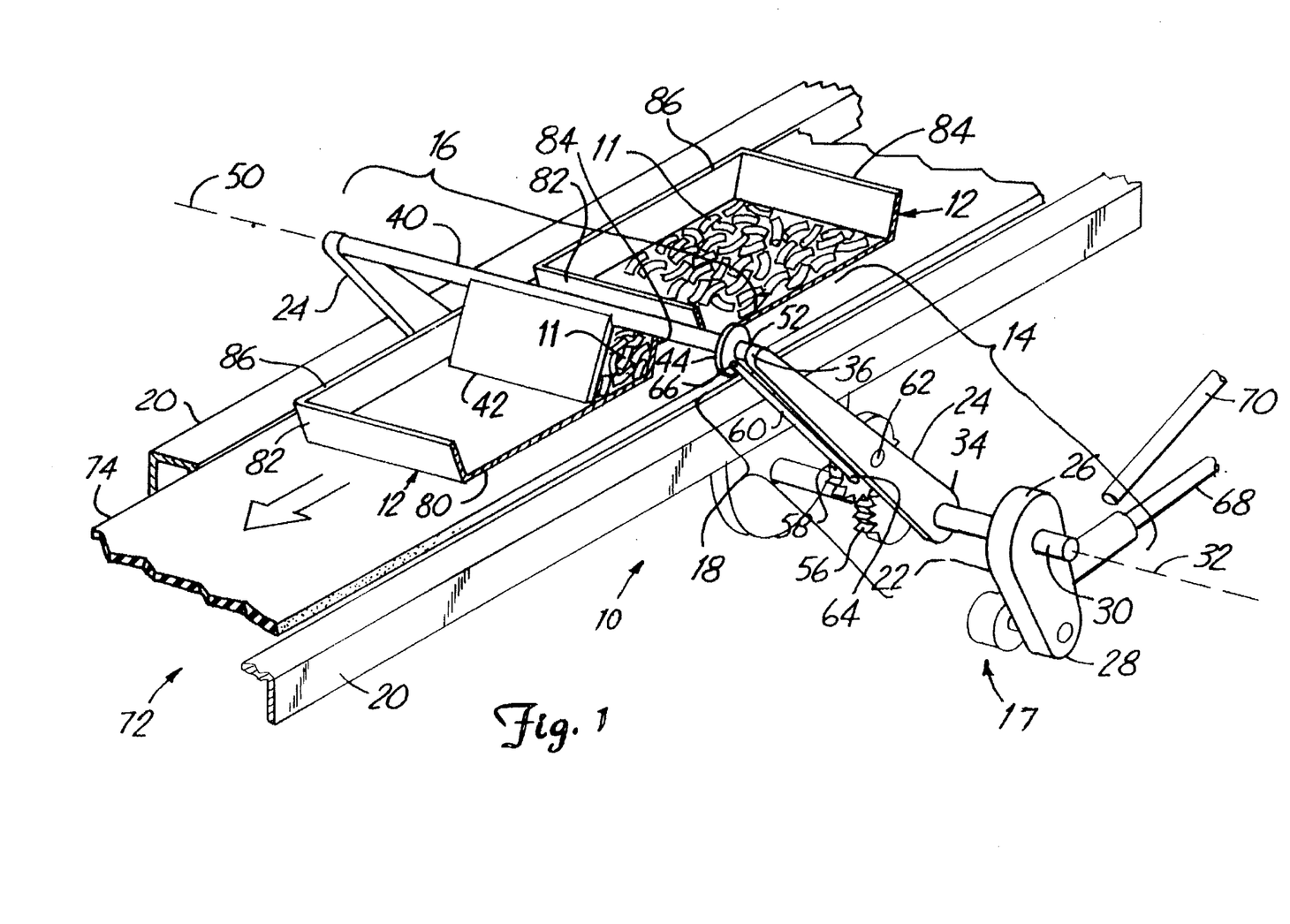
FIG. 1 is a perspective view of a food positioning apparatus according to the present invention.
Figure 2:
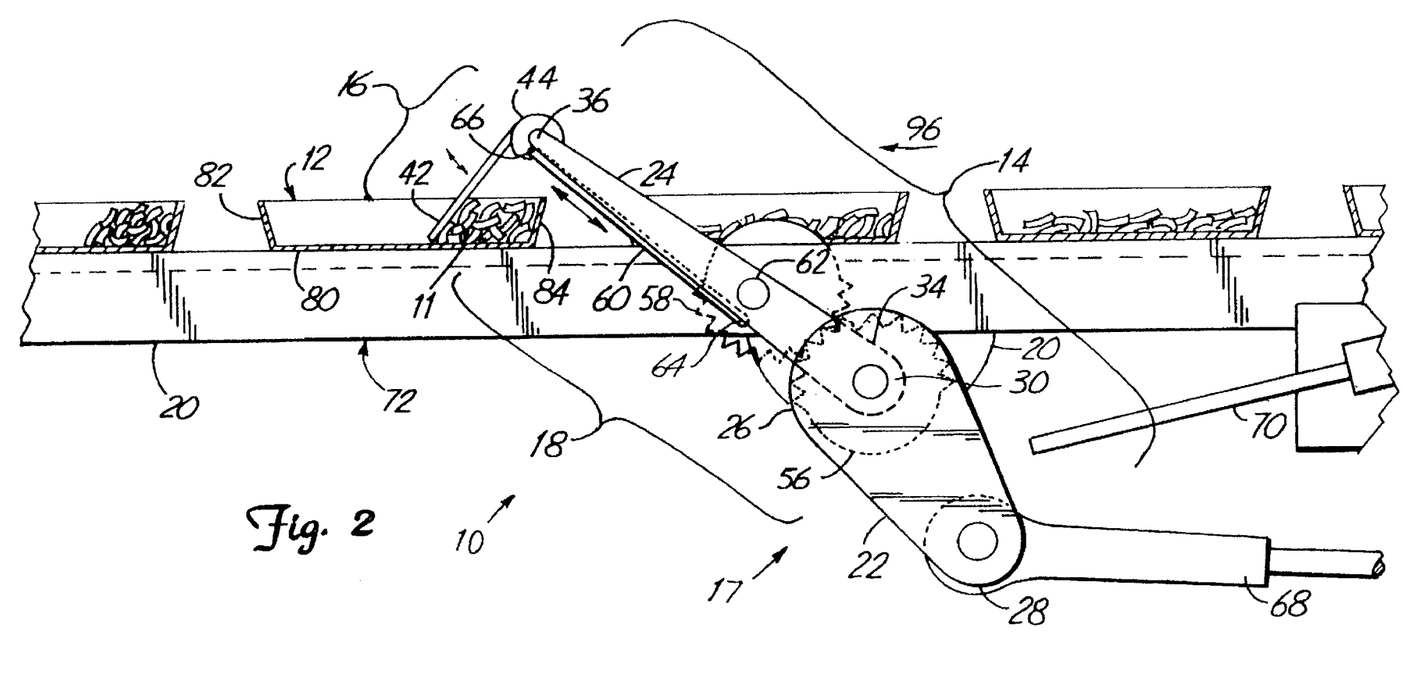
FIG. 2 is a sectional view of the food positioning apparatus in a first position.

The present invention includes a food positioning apparatus 10 for positioning food components 11 in a container 12 as illustrated in FIGS. 1 and 2. The food positioning apparatus 10 has a paddle mechanism 16 and a link 17 that connects the paddle mechanism 16 to a frame 20.

The link 17 moves the paddle mechanism 16 from a first position within the container 12 to a second position outside of the container 12. As the paddle mechanism 16 moves between the first position and the second position, the link 17 causes the paddle mechanism 16 to pivot with respect to the link 17.

The link 17 includes an arm mechanism 14 and a control mechanism 18. The arm mechanism 14 is pivotally attached to a frame 20. The paddle mechanism 16 is pivotally attached to the arm mechanism 14. The control mechanism 18 causes the paddle mechanism 16 to pivot with respect to the arm mechanism 14 when the arm mechanism 14 is pivoted with respect to the frame 20. The pivoting of the paddle mechanism 16 with respect to the arm mechanism 14 when the arm mechanism 14 is pivoted with respect to the frame 20 is referred to as multi-directional motion.

The arm mechanism 14 includes a shaft 30 rotatably attached to the frame 20 and rotatable about an axis 32. The arm mechanism 14 also includes a first arm portion 22 and a second arm portion 24. The first arm portion 22 has a first end 26 and a second end 28. The first end 26 of the first arm portion 22 is fixedly attached to the shaft 30 permitting the first arm portion 22 to pivot about the axis 32 when the shaft 30 is rotated.

The second arm portion 24 has a first end 34 and a second end 36. The first end 34 of the second arm portion 24 is fixedly attached to the shaft 30. The attachment of the first arm portion 22 and the second arm portion 24 to the shaft 30 allows the first arm portion 22 and the second arm portion 24 to pivot as a unit about the axis 32 when the shaft 30 is rotated.

The paddle mechanism 16 preferably includes a rod 40, a paddle 42, and a cam 44. The rod 40 is rotatably attached to the second end 36 of the second arm portion 24 such that the rod 40 rotates about an axis 50. The paddle 42 is fixedly attached to the rod 40. The attachment of the paddle 42 to the rod 40 allows the paddle 42 to pivot with respect to the second arm portion 24. The cam 44 is fixedly attached to the rod 40 proximate to an end 52 of the rod 40.

Pivoting of the paddle 42 with respect to the second arm portion 24 is directed by the control mechanism 18. The control mechanism 18 preferably includes a first gear 56 and a second gear 58.

The first gear 56 is fixedly attached to the frame 20. The second gear 58 is rotatably attached to the second arm portion 24 with a pin 62. The second gear 58 is positioned to operably engage the first gear 56 so that the second gear 58 rotates when the first arm portion 22 is pivoted with respect to the frame 20.

The control mechanism 18 includes a connecting rod 60 that has a first end 64 and a second end 66. The first end 64 is attached to the second gear 58 and the second end 66 is attached to the cam 44. As a result of the connecting rod 60 operably attaching the second gear 58 to the cam 24, the paddle 42 pivots with respect to the second arm portion 24 when the first arm portion 22 pivots with respect to the frame 20.

When items are fabricated in an assembly line manner, it is typically more efficient to control the operation of the various elements of the assembly line through a common source. The common source is frequently a rotating line shaft (not shown), which is mounted beneath the assembly line. The operation of various elements of the assembly line is controlled by selectively engaging the rotating line shaft (not shown).

In the present invention, a connecting arm 68 is attached to the second end 28 of the first arm portion 22. The rotating line shaft (not shown) is operably connected to the connecting arm 68 using a series of gears and chains (not shown) that interact to convert the rotational motion of the rotating line shaft into a reciprocating motion of the connecting arm 68.

The food positioning apparatus 10 of the present invention preferably includes an adjustable stop 70. The length of the adjustable stop 70 is varied to selectively control the pivoting range of the first arm portion 22 by contacting the first arm portion 22. By controlling the pivoting range of the first arm portion 22, the pivoting range of the paddle 42 with respect to the second portion 24 is also controlled. The adjustable stop 70 thereby enables the placement of the food components 11 in the container 12 to be controlled.

To minimize the stress placed on the components of the food positioning apparatus 10 caused by the adjustable stop 70 interrupting the pivoting range of the first arm portion 22, the connecting rod 68 is preferably constructed to allow a length of the connecting rod 68 to vary in response to the adjustable stop 70 contacting the first arm portion 22. Preferably, the connecting rod 68 includes two rod portions (not shown) that are connected with a resilient portion (not shown), such as a spring. During the operation of the food positioning apparatus 10, the resilient portion retains the rod portions in a constant relationship such that the length of the connecting rod 68 remains constant. However, when the first arm portion 22 contacts the adjustable stop 70, the resilient portion deforms to allow the length of the connecting rod 68 to decrease and thereby reduce the stress placed on the components of the food positioning apparatus 10.

A conveyor 74 is positioned on the frame 20. The conveyor 74 moves with respect to the frame 20 and the food positioning apparatus 10 in a machine direction as indicated by arrow 96. The food positioning apparatus 10, the frame 20, and the conveyor 74 form a portion of an assembly line 72.

In operation, containers 12, which are suitable for holding a prepared food product having at least one food component 11, are delivered along the conveyor 74. Each container 12 includes a base 80 and a plurality of side walls 86 extending from the base 80.

Figure 3:
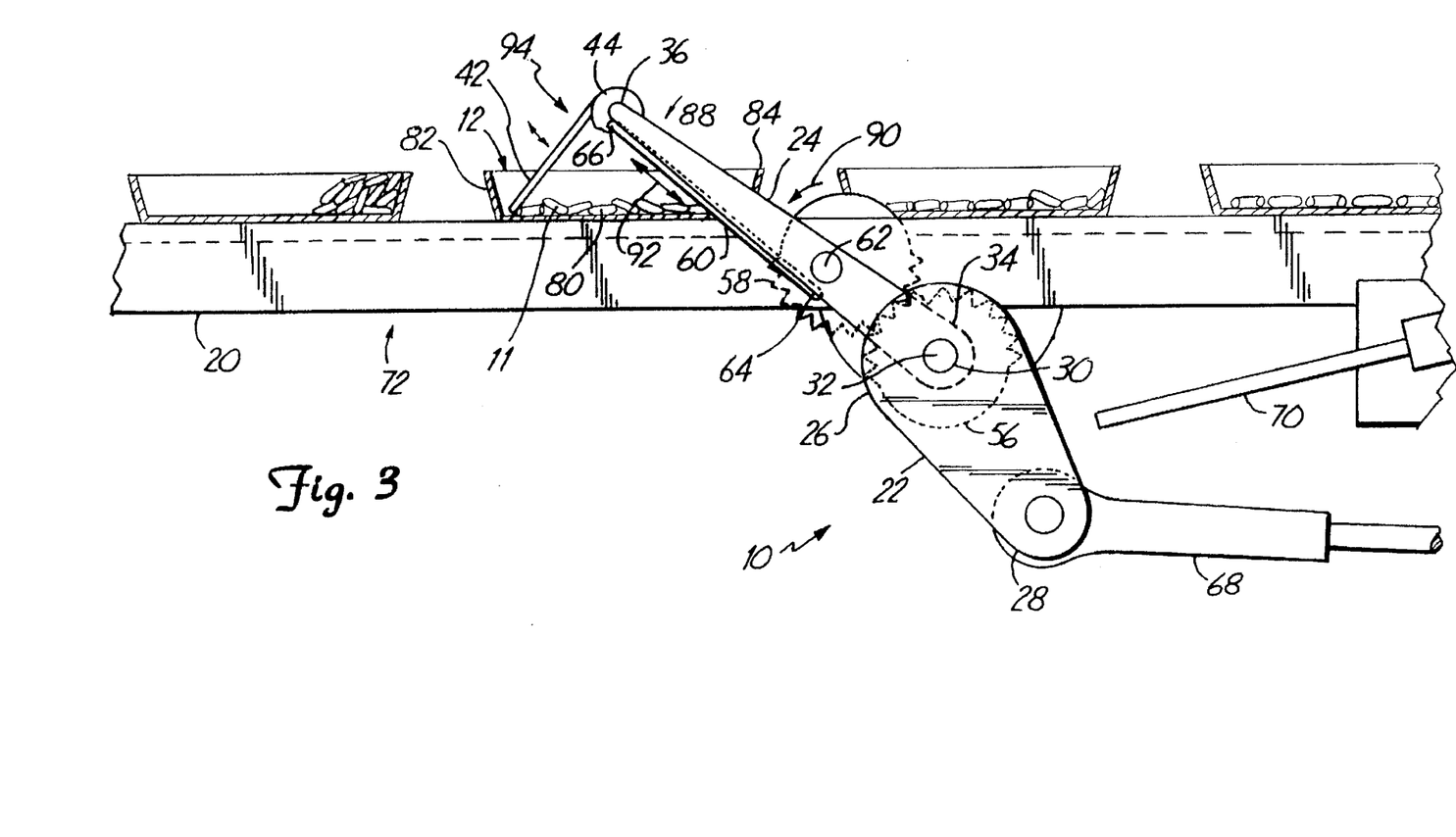
FIG. 3 is a sectional view of the food positioning apparatus in a second position.

A desired amount of the food components 11 is placed in the container 12. The container 12 is then moved in the machine direction 96 along the conveyor 74 until the container 12 is positioned beneath the food positioning apparatus 10 as illustrated in FIG. 3. Once the side wall 86 moves past the paddle 42, the arm mechanism 14 pivots in a counterclockwise direction as indicated by arrow 88. Pivoting of the arm mechanism 14 in the counterclockwise direction 88 causes the second gear 58 to rotate in a counterclockwise direction as indicated by arrow 90. Rotation of the second gear 58 then causes the connecting arm 60 to move with respect to the second arm portion 24 towards the axis 32 as indicated by arrow 92. Movement of the connecting arm 60 then causes the paddle 42 to pivot with respect to the second arm portion 24 in a counterclockwise direction as indicated by arrow 94. The pivoting of the arm mechanism 14 and the paddle 42 thereby results in the paddle 42 being positioned proximate to the base 80 in the container 12.

The paddle 42 remains positioned in the container 12 as the container 12 moves a desired distance in the machine direction 96 as illustrated in FIG. 2. The movement of the container 12 with respect to the food positioning apparatus 10 causes the paddle 42 to contact the food components 11. The continued movement of the container 12 results in the food components 11 being moved to the desired area of the container 12.

Figure 4:
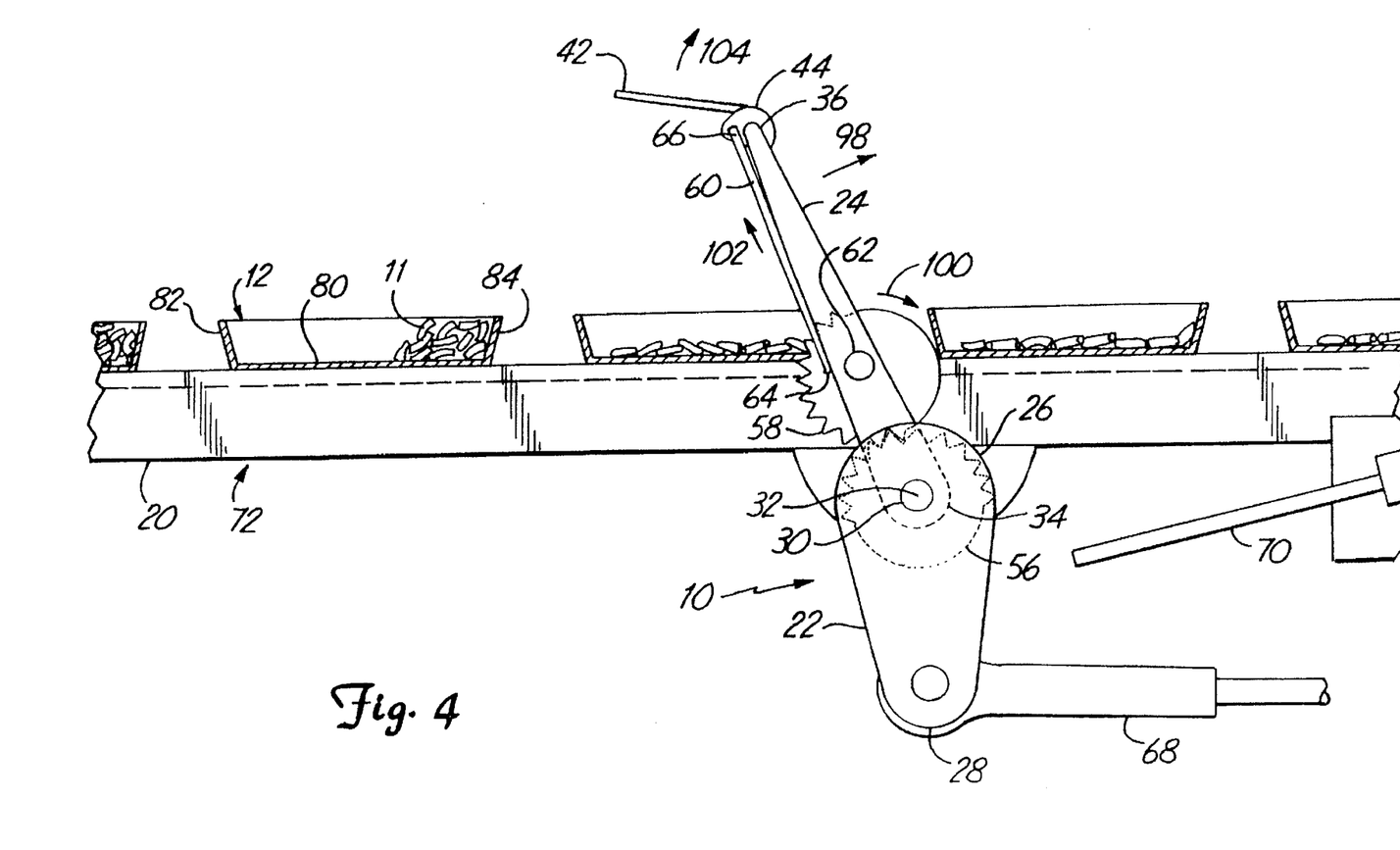
FIG. 4 is a sectional view of the food positioning apparatus in a third position.

As the container 12 continues moving in the machine direction 96, the arm mechanism 14 pivots away from the conveyor 74 in a clockwise direction as indicated by arrow 98 in FIG. 4. Pivoting of the arm mechanism 14 causes the second gear 58 to rotate in a clockwise direction as indicated by arrow 100. Rotation of the second gear 58 causes the connecting arm 60 to move with relation to the second arm portion 24 away from the axis 32 as indicated by arrow 102. Movement of the connecting arm 60 then causes the paddle 42 to pivot with respect to the second arm portion 24 in a clockwise direction as indicated by arrow 104. The pivoting of the arm mechanism 14 with respect to the frame 20 and the paddle 42 with respect to the arm mechanism 14 allows the paddle 42 to avoid contacting the side wall 86 of the container 12 as the container 12 moves on the conveyor 74.

Because the arm mechanism 14 pivots with respect to the frame 20 and the paddle 42 pivots with respect to the arm mechanism 14, the food positioning apparatus 10 of the present invention provides superior results to prior art food positioning devices where the paddle could not pivot with respect to the arm. For example, the food positioning device 10 of the present invention allows the food components 11 to be moved to a smaller area of the container 12. To move the food components 11 to the smaller area of the container 12, the paddle 42 must remain in the container 12 for a longer period of time. As the arm mechanism 14 and the paddle 42 are pivoted out of the container 12, the movement of both the arm mechanism 14 and the paddle 42 enable the food positioning apparatus 10 to more rapidly move above the side wall 86 and thereby avoid contacting the container 12.

The longer residence time in the container was not possible with the prior art food positioning apparatus because it was not possible to pivot the food positioning apparatus so as to avoid the paddle contacting the rear wall of the container. To obtain a longer residence time, the prior art food positioning apparatus was moved at an increased rate. However, it was found that the increased movement rate provided unsatisfactory results in positioning the food components in the desired area of the container.

Figure 5:
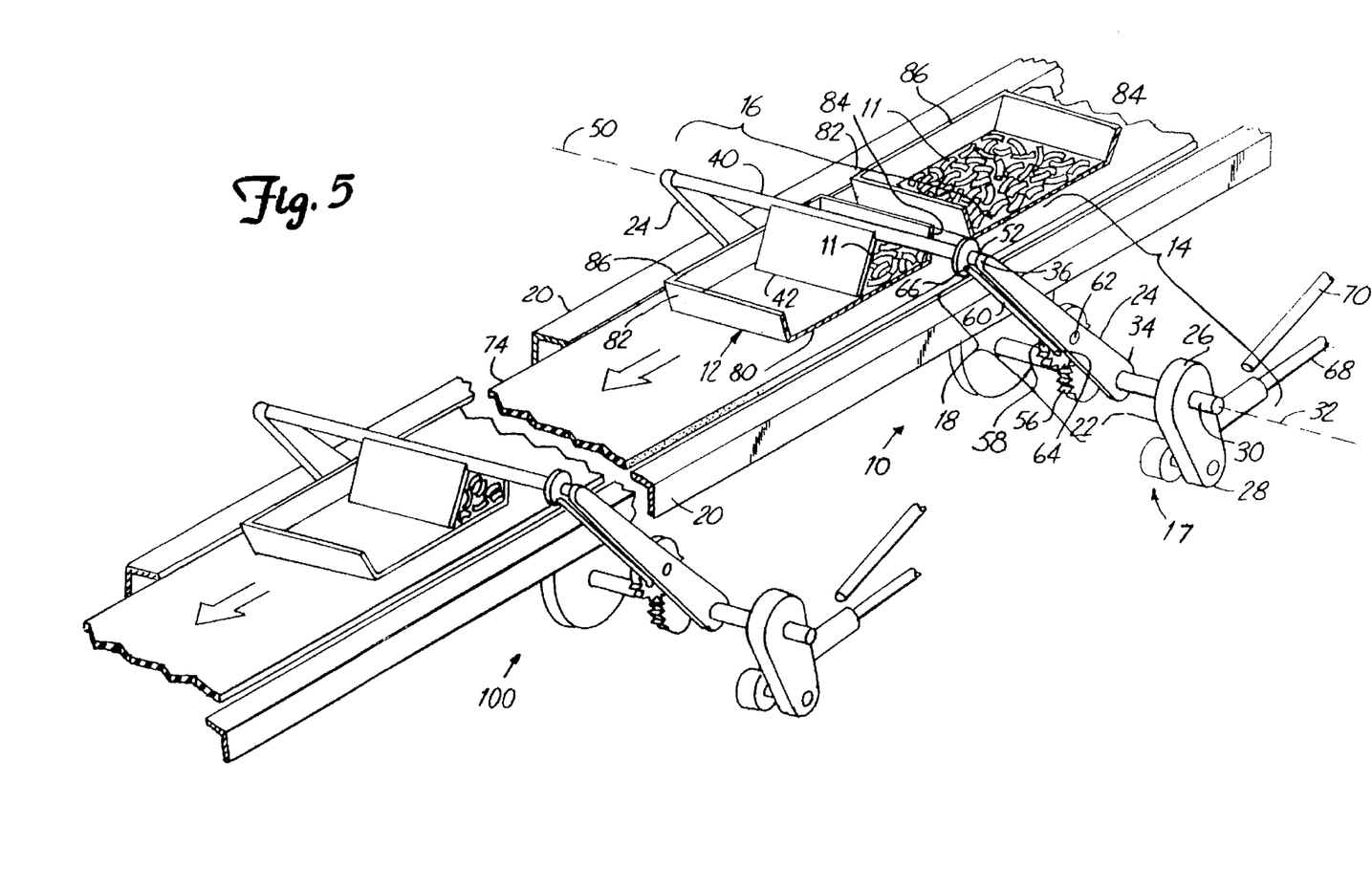
FIG. 5 is a perspective view of a pair of food positioning apparatuses working in a series orientation.

The present invention also includes an embodiment where more than one food positioning apparatus 10, 100 is mounted along the conveyor 74 as illustrated in FIG. 5. Each of the food positioning apparatuses 10, 100 preferably contains a structure that is similar to the structure described with reference to FIGS. 1–4.

Using two food positioning apparatuses 10, 100 in a series orientation provides several advantages. For example, with certain types of food components 11 it is difficult to move the food components 11 to the desired area of the container 12. The difficulties may arise because the food components are long or do not bend easily.

Attempting to move this type of food components 11 to the desired area of the container 12 in a single step may damage the food components 11. With the two food positioning apparatuses 10, 100 system, the food components 11 can be moved a portion of the desired distance with the first food positioning apparatus 10 and then the remainder of the distance with the second food positioning apparatus 100. The two-step movement of the food components 11 thereby reduces the damage of the food components 11.

Alternatively, the food components 11 may relax to an area that is greater than the desired area after the paddle 42 moves out of the container 10. Using two food positioning apparatuses 10, 100, the food components 11 are moved to the desired area of the container 12 with the first food positioning apparatus 10. The food components 11 then relax to an area that is greater than the desired area when the paddle 42 is moved out of the container 12.

The second food positioning device 100 then moves the food components 11 back to the desired area of the container 12. When the paddle 42 on the second food positioning apparatus 100 moves out of the container 12, the food components 11 once again relax but the amount of relaxation is smaller than with the one-step movement process.

Although the present invention has been described with reference to preferred embodiments, workers skilled in the art will recognize that changes may be made in form and detail without departing from the spirit and scope of the invention.

What is claimed is:

1. An apparatus for positioning food components in a container that is moving along a conveyor, the apparatus comprising:

a paddle member movable between a first position within the container and a second position outside of the container and pivotable when the paddle member is moved between the first position and the second position, the paddle member being adapted to engage the food components and move the food components to a selected location in the container as the container moves along the conveyor; and a link for moving the paddle member between the first position and the second position and pivoting the paddle member as the paddle member is moved between the first position and the second position.

2. The apparatus of claim 1 wherein the link includes an arm that is retained in operable relation to the conveyor, the paddle member being pivotally attached to the arm.

3. The apparatus of claim 2 wherein the arm is rotatably attached to the conveyor.

4. The apparatus of claim 3 wherein the link further includes:

a first gear fixedly attached to the conveyor;

a second gear rotatably attached to the arm, the second gear operably engaging the first gear; and a connecting rod attached to the second gear and the paddle, rotation of the second gear moving the connecting rod with respect to the arm and thereby causing the paddle to rotate with respect to the arm.

5. The apparatus of claim 4 and further comprising means for causing reciprocating motion of the arm, the means for causing reciprocating motion of the arm being connected to the arm.

6. The apparatus of claim 5 wherein the reciprocating motion of the arm causes the arm to alternatively move in a clockwise direction and a counterclockwise direction with respect to the frame, the paddle moving in the clockwise direction with respect to the arm when the arm moves in the clockwise direction with respect to the frame, the paddle moving in the counterclockwise direction with respect to the arm when the arm moves in the counterclockwise direction with respect to the frame.

7. An apparatus for positioning food in a container, the apparatus comprising:

a frame;

an arm retained in relation to the frame;

a paddle pivotally attached to the arm; and means for causing the arm to pivot with respect to the paddle when the arm is moved with respect to the frame.

8. The apparatus of claim 7 and further comprising a shaft rotatably attached to the frame, and wherein the arm comprises a first arm portion and a second arm portion, the first arm portion and the second arm portion each being fixedly attached to the shaft such that the first arm portion and the second arm portion are rotatable with relation to the frame.

9. The apparatus of claim 8 and further comprising:

a first gear fixedly attached to the frame;

a second gear rotatably attached to the second arm portion, the second gear operably engaging the first gear; and a connecting rod attached to the second gear and the paddle, rotation of the second gear moving the connecting rod with respect to the second arm portion and thereby causing the paddle to rotate with respect to the second arm portion.

10. The apparatus of claim 9 and further comprising means for causing reciprocating motion of the arm, the means for causing reciprocating motion of the arm being connected to the first arm portion.

11. The apparatus of claim 10 wherein the reciprocating motion of the arm causes the arm to alternatively move in a clockwise direction and a counterclockwise direction with respect to the frame, the paddle moving in the clockwise direction with respect to the arm when the arm moves in the clockwise direction with respect to the frame, the paddle moving in the counterclockwise direction with respect to the arm when the arm moves in the counterclockwise direction with respect to the frame.

12. An apparatus for positioning food in a container, the apparatus comprising:

a frame;

a first gear fixedly attached to the frame;

a first arm having a first end and a second end, the first end of the first arm being pivotally attached to the frame for pivoting about an axis;

a second arm having a first end and a second end, the first end of the second arm being fixedly attached to the first arm such that the second arm pivots about the axis when the first arm pivots about the axis;

a second gear rotatably attached to second arm, the second gear operably engaging the first gear;

a paddle pivotally attached to the second end of the second arm;

means for causing reciprocating motion;

a connecting arm pivotally attached to the second end of the first arm and attached to the means for causing reciprocating motion; and a connecting rod attached to the second gear and the paddle, pivoting of the first arm with respect to the frame causing the second arm to pivot with respect to the frame and causing the paddle to pivot with respect to the second arm.

13. The apparatus of claim 12 wherein the reciprocating motion of the first arm causes the first arm and the second arm to alternatively pivot in a clockwise direction and a counterclockwise direction with respect to the frame, the paddle moving in the clockwise direction with respect to the second arm when the first arm and the second arm move in the clockwise direction with respect to the frame, the paddle moving in a counterclockwise direction with respect to the second arm when the first arm and the second arm move in the counterclockwise direction with respect to the frame.

14. An apparatus for positioning food components in a container that is moving along a conveyor, the apparatus comprising:

a first paddle member movable between a first position within the container and a second position outside of the container and pivotable when the first paddle member is moved between the first position and the second position, the first paddle member being adapted to engage the food components and move the food components to a first portion of the distance to a selected location in the container as the container moves along the conveyor;

a first link for moving the first paddle member between the first position and the second position and pivoting the first paddle member as the first paddle member is moved between the first position and the second position;

a second paddle member movable between a first position within the container and a second position outside of the container and pivotable when the second paddle member is moved between the first position and the second position, the second paddle member being adapted to engage the food components and move the food components to a second portion of the distance to a selected location in the container as the container moves along the conveyor; and a second link for moving the second paddle member between the first position and the second position and pivoting the second paddle member as the second paddle member is moved between the first position and the second position.

15. The apparatus of claim 14 wherein the first and second links each include an arm that is retained in operable relation to the conveyor, the first paddle member being pivotally attached to the first arm and the second paddle member being pivotally attached to the second arm.

16. The apparatus of claim 15 wherein the first and second arms are each rotatably attached to the conveyor.

17. The apparatus of claim 16 wherein the link further includes:

a first gear fixedly attached to the conveyor;

a second gear rotatably attached to the arm, the second gear operably engaging the first gear; and a connecting rod attached to the second gear and the paddle, rotation of the second gear moving the connecting rod with respect to the arm and thereby causing the paddle to rotate with respect to the arm.

18. The apparatus of claim 18 and further comprising means for causing reciprocating motion of the arm, the means for causing reciprocating motion of the arm being connected to the arm.

19. The apparatus of claim 18 wherein the reciprocating motion of the arm causes the arm to alternatively move in a clockwise direction and a counterclockwise direction with respect to the frame, the paddle moving in the clockwise direction with respect to the arm when the arm moves in the clockwise direction with respect to the frame, the paddle moving in the counterclockwise direction with respect to the arm when the arm moves in the counterclockwise direction with respect to the frame.

20. A process for positioning a food component in a container, the process comprising:

moving an arm with relation to a conveyer; and pivoting a paddle with relation to the arm wherein moving the arm with relation to the conveyer and the pivoting of the paddle with relation to the arm causes the paddle to be positioned in the container.

21. The process of claim 20 wherein the moving of the arm with relation to the conveyor and the pivoting of the paddle with relation to the arm occur simultaneously.

22. The process of claim 21 wherein the moving of the arm is in a reciprocating motion, which causes the arm to alternatively pivot in a clockwise direction and a counterclockwise direction with respect to the conveyor, the paddle pivoting in the clockwise direction with respect to the arm when the arm pivots in the clockwise direction with respect to the conveyor, the paddle pivoting in the counterclockwise direction with respect to the arm when the arm pivots in the counterclockwise direction with respect to the conveyor.

23. The process of claim 22 and further comprising:

rotating a gear as the arm pivots with respect to the conveyor; and moving a connecting rod with respect to the arm, the moving of the connecting arm causing the paddle to pivot with respect to the arm.

24. The process of claim 23 wherein the paddle remains in the container as the container moves a selected distance along the conveyor, the paddle contacting the food component in the container as the container moves along the conveyor and causing the food component to move to a desired area of the container.

25. The process of claim 24 and further comprising pivoting the arm with respect to the frame and pivoting the paddle with respect to the arm after the container has moved the selected distance along the conveyor, the pivoting of the arm and the paddle causing the paddle to move from the position in the container.

26. A process for positioning a food component in a container, the process comprising:

moving the container along a conveyor;

placing the food component in the container;

pivoting an arm about an axis in response to a position of the container with respect to the arm;

rotating a gear with respect to the arm;

moving a connecting rod with respect to the arm;

rotating a paddle with respect to the arm, the pivoting of the arm causing the paddle to be positioned in the container;

retaining the paddle in the container as the container is moved a selected distance along the conveyor such that the paddle contacts the food components in the container and causes the food components to moved to a desired area of the container;

pivoting the arm with respect to the frame after the container has moved the selected distance along the conveyor; and pivoting the paddle with respect to the arm after the container has moved the selected distance along the conveyor, the pivoting of the arm with respect to the frame and the paddle with respect to the arm causing the paddle to move from the position in the container.

27. The process of claim 26 wherein the pivoting of the arm with respect to the frame and the pivoting of the paddle with respect to the arm occur simultaneously.

28. The process of claim 27 wherein the pivoting of the arm is in a reciprocating motion, which causes the arm to alternatively pivot in a clockwise direction and a counterclockwise direction with respect to the conveyor, the paddle rotating in the clockwise direction with respect to the arm when the arm pivots in the clockwise direction with respect to the conveyor, the paddle rotating in the counterclockwise direction with respect to the arm when the arm pivots in the counterclockwise direction with respect to the conveyor.

* * * * *